United States Patent
Khandelwal et al.

(10) Patent No.: US 7,370,121 B2
(45) Date of Patent: May 6, 2008

(54) SYSTEM AND METHOD FOR THE CAPTURE, STORAGE AND MANIPULATION OF REMOTE INFORMATION

(75) Inventors: Harsch Khandelwal, Kitchener (CA); Michael Blackburn, Waterloo (CA); Paul Hoskins, Waterloo (CA); Gregory Alexanian, Waterloo (CA)

(73) Assignee: NID Solutions, Inc., Waterloo, Ontario (CA)

( * ) Notice: Subject to any disclaimer, the term of this patent is extended or adjusted under 35 U.S.C. 154(b) by 404 days.

(21) Appl. No.: 10/615,211

(22) Filed: Jul. 7, 2003

(65) Prior Publication Data
US 2004/0078578 A1    Apr. 22, 2004

(30) Foreign Application Priority Data
Jul. 5, 2002   (CA) ................................... 2392637
Oct. 7, 2002   (CA) ................................... 2406808

(51) Int. Cl.
*G06F 3/00*   (2006.01)
*G06F 13/00*  (2006.01)
*G06F 5/00*   (2006.01)

(52) U.S. Cl. ............................... 710/8; 710/15; 710/73
(58) Field of Classification Search .................... 710/8, 710/15, 73
See application file for complete search history.

(56) References Cited
U.S. PATENT DOCUMENTS

| | | | |
|---|---|---|---|
| 5,722,526 A | 3/1998 | Sharrard | |
| 5,864,623 A | 1/1999 | Messina et al. | |
| 6,148,091 A | 11/2000 | DiMaria | |
| 6,196,460 B1 | 3/2001 | Shin | |
| 2001/0016819 A1* | 8/2001 | Kolls | 705/1 |
| 2001/0034635 A1* | 10/2001 | Winters | 705/10 |
| 2002/0029164 A1* | 3/2002 | Sugar et al. | 705/13 |
| 2002/0039432 A1 | 4/2002 | Sheena | |
| 2003/0069898 A1 | 4/2003 | Christodoulou et al. | |
| 2003/0158791 A1* | 8/2003 | Gilberto et al. | 705/27 |

OTHER PUBLICATIONS

GUI control, chapter 13, URL: http://www.apl.jhu.edu/~hall/CWP-Chapter13.*

* cited by examiner

Primary Examiner—Henry Tsai
Assistant Examiner—Scott Sun
(74) Attorney, Agent, or Firm—Shumaker & Sieffert, P.A.

(57) ABSTRACT

A system and method for the capture, storage and manipulation of remote information is disclosed. The system includes at least one remote information capture device located at a remote site for capturing remote data, a central database accessible by the remote capture device for storing the captured remote data, and a computer program operative to manipulate the captured data. The method includes the steps of capturing remote data, storing the captured remote data, and manipulating the stored data.

36 Claims, 15 Drawing Sheets

SYSTEM AND METHOD FOR THE CAPTURE, STORAGE AND MANIPULATION OF REMOTE INFORMATION

This application claims priority from Canadian Patent Application Serial No. 2,392,637 filed Jul. 5, 2002 and Canadian Patent Application Serial No. 2,406,808 filed Oct. 7, 2002, the entire contents of which is incorporated herein by reference.

FIELD OF THE INVENTION

The present invention relates generally to data collection and manipulation methods and systems, and more particularly to a data capture system and method.

BACKGROUND OF THE INVENTION

With the growth of age-restricted products such as lottery tickets, adult magazines, guns and ammunition, fireworks, condoms, smoking patches, medical supplies, alcohol, tobacco, vehicles, and rental movies, as well as age-restricted services such as gambling, movie theaters, and adult entertainment and licensed establishments, businesses and governmental agencies have had to develop policies to determine proof of age. The use of driver licenses to serve as identification in various applications has grown to include applications such as the purchase of alcohol, tobacco or lottery products, as well as for gambling in casinos, movie theaters, allowing ingress into licensed establishments. All of these applications have an age requirement for the purchase of a product at a point-of-transaction or for ingress into an establishment, and the driver license is the document used to provide age identification and all age verification is commonly accomplished in a relatively quick manner.

There are various forms of identification that are commonly accepted by businesses and government agencies as proof of age. The most convenient forms of identification are government issued documents such as a driver's license, passport, social security card, voter's registration card, and immigration card. Another example of an identification document is a smart card that contains memory provided by an embedded integrated circuit. These documents provide personal information regarding the authorized bearer of the identification document in at least one machine-readable medium such as a barcode or magnetic stripe. Many identifying documents have more than one machine-readable medium for storing identifying information.

For example, a driver's license typically includes a photograph, printed textual information, and visible encoded information such as a barcode. In some cases a magnetic stripe provides a higher level of security and additional information regarding the bearer. For example, the information stored in the magnetic stripe of a driver's license may include identifying information about the authorized bearer, such as eye color, hair color, height, weight, and biometric patterns. The barcode and magnetic stripe may also include data related to ascertaining the age of the bearer. Alternatively, the above information may be stored in the memory of an embedded integrated circuit on a smart card.

There is also a need to authenticate the contents of a driver license, such as authenticating identification for credit card and check writing at point-of-sale. Further uses include authenticating driver licenses in police cars, ports of entry such as domestic and foreign airports, seaports, rail stations and border checkpoints, and points of entry to government/military buildings and other sensitive areas. Verifying identity is also important in other areas such as child day care centers and post offices to verify parcel pick-up and drop-off.

The problem of readily available fraudulent identification cards has cost many retailers fines, loss of tobacco and liquor vending licenses, and subjected them to other forms of civil and criminal liability. Over the years, various attempts have been made to prevent or detect the use of fake identification cards, but without a great deal of success. To help prevent the use of fraudulent identification, government agencies have begun issuing new driver licenses with embedded code, or even encrypted coded information, with machine-readable formats that conform to industry/governmental standards.

Establishments wishing to avoid the sale of tobacco or alcohol to minors may check the photograph and date of birth printed on driver's licenses. However, many youths and others have easy access to counterfeit identification. Accordingly, there is a need to confirm the correct age of a customer wishing to purchase alcohol, tobacco and other age-controlled products and services by reading encoded data on at least one machine readable medium.

Early prior art methods of consumer personal and preference data capture involved the use of paper ballots, and the manual entry of handwritten information from these paper ballots. Using paper ballots for data collection and personnel for manual data entry. Traditional analysis of this data is conducted with spreadsheets.

More recent prior art identity verification methods and products involve services and data collection systems that include cumbersome and outdated equipment, if available at all, and often go unused since it is labor intensive to verify ID's. This equipment is typically non-user friendly and the equipment and manpower are typically underutilized resulting in a lack of information sharing within industries that could otherwise benefit from sharing such as the bar & beverage industry, special interest groups like MADD (Mothers Against Drunk Driving), the tobacco industry, and health organizations and associations.

Although company specific loyalty and rewards cards have been around for many years, there has been no attempt to use a standard form of identification such as a driver's license to identify consumers by several companies and tie multiple company specific customizable messages, such as "Good Customer" or "Banned From This Store", to each. Furthermore, there is currently no way to easily set flexible rewards in varying degrees of granularity down to a consumer specific level. There is also a problem of identifying "double dippers" or multiple people trying to get restricted access using a single piece of identification or multiple copies of the same piece of ID. Existing methods rely on the person responsible for ensuring restricted access to identify "double dippers".

As well, capturing email addresses has been a relatively tedious task. It has been typically accomplished in the past by collecting email addresses using paper ballots. In instances where consumers were eligible to win a prize for providing the ballot information the prize was awarded simply by putting all the ballots in a box and randomly drawing one to select the winner.

What is needed is a method of authenticating the contents of identification cards so that any access to a product or service having an age requirement is satisfied at the time of access in a quick and convenient manner, to safeguard businesses and others against the penalties that may otherwise be encountered from the use fraudulent identification cards. What is further needed is a way to collect demographic data efficiently on a mobile computer in a manner that minimizes the data entry time. Currently, demographic data is largely collecting using paper based systems. In cases where mobile computers are used, the process of entering data is very time consuming.

For the foregoing reasons, there is a need for an improved method and system for remote data capture, storage and manipulation.

SUMMARY OF THE INVENTION

The present invention is directed to a system and method for the capture, storage and manipulation of remote information. The system includes at least one remote information capture device located at a remote site for capturing remote data, a central database accessible by the remote capture device for storing the captured remote data, and a computer program operative to manipulate the captured data.

In an aspect of the present invention, at least one capture device includes a barcode reader. In an aspect of the present invention, at least one capture device is a wireless device to enable operator mobility. In an aspect of the present invention, the remote information is patron data.

The method includes the steps of capturing remote data, storing the captured remote data, and manipulating the stored data.

Venues and businesses have the ability to demonstrate not only compliance with legislation but good corporate governance with being able to display and effect due diligence proof, therefore benefiting their best business practices but also their proactive approach that they can then leverage into good public relations within the community. The invention is easy to use for untrained data collection labor. There is a high rate of consumer data collection ability of the system as well as an ability to quickly and cost effectively display captured data to the clients management team in a more timely manner than a paper ballot system.

The invention enhances the profitability, cost effectiveness, efficiency, and quality of the ID experience for customers of the verifier and the identity verification products and services community. The invention can incorporate loyalty and rewards programs. Administration is quick, simple and done on an automated basis enabling costs to clients to be kept as low as possible. The data provides detailed and accurate information on the target market accounting of charges relative to the data requested, thus the mountains of support documentation clients received previously through alternative channels are no longer needed. It can become so simple that the acceptance and transmission of the data can become the invoice and authorization for payment.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

These and other features, aspects, and advantages of the present invention will become better understood with regard to the following description, appended claims, and accompanying drawings where:

FIG. 4 illustrates an information capture screen;

FIG. 5 illustrates an e-mail manipulation screen;

FIG. 8 illustrates an email invitation;

FIG. 15 illustrates a first name screen;

FIG. 16 illustrates a last name screen;

FIG. 22 illustrates manual consumer data capture screens;

DETAILED DESCRIPTION OF THE PRESENTLY PREFERRED EMBODIMENT

Figure 1:
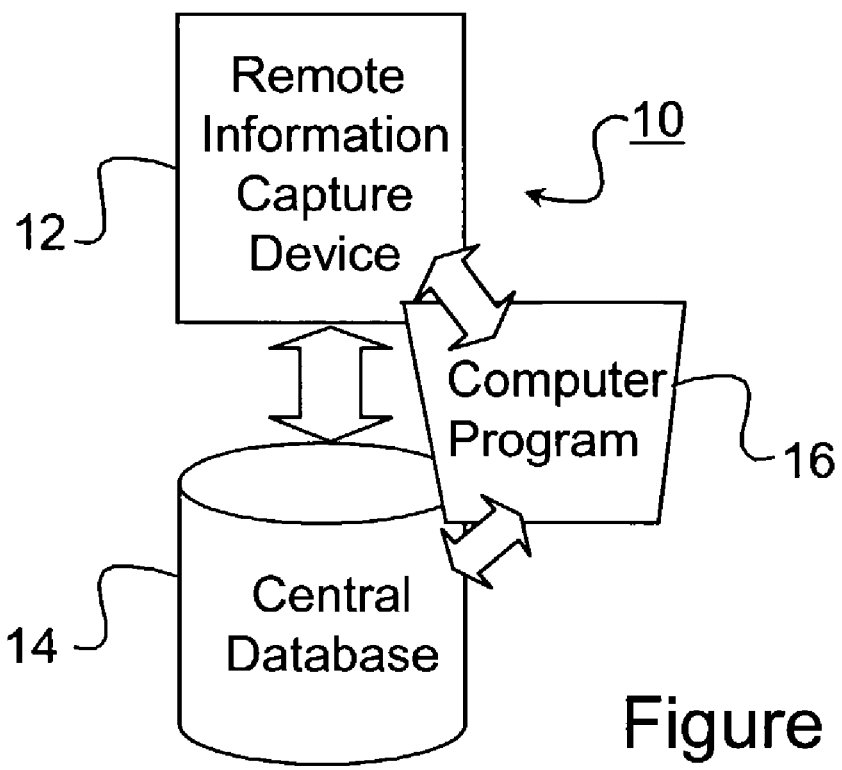
FIG. 1 is an overview of an ID authentication system in accordance with the present invention.

The present invention is directed to a system and method for the capture, storage and manipulation of remote information. As illustrated in FIG. 1, the system 10 includes at least one remote information capture device 12 located at a remote site for capturing remote data, a central database 14 accessible by the remote capture device 12 for storing the captured remote data, and a computer program 16 operative to manipulate the captured data.

In an embodiment of the present invention, at least one capture device 12 includes a barcode reader. In an embodiment of the present invention, at least one capture device 12 is a wireless device to enable operator mobility. The capture device 12 is capable of capturing remote data. The remote data may include customer data. The remote data may include patron data. The remote data may include security rounds data. The remote data may include parking data. In an embodiment of the present invention, the remote information is patron personal and preference data. In an embodiment of the present invention, the remote capture devices 12 include wireless LAN and/or WAN-enabled units that can communicate with the central database 14 in real time over the Internet. This eliminates the need to dock the unit in a cradle to dump the data to the central database 14.

Figure 2:
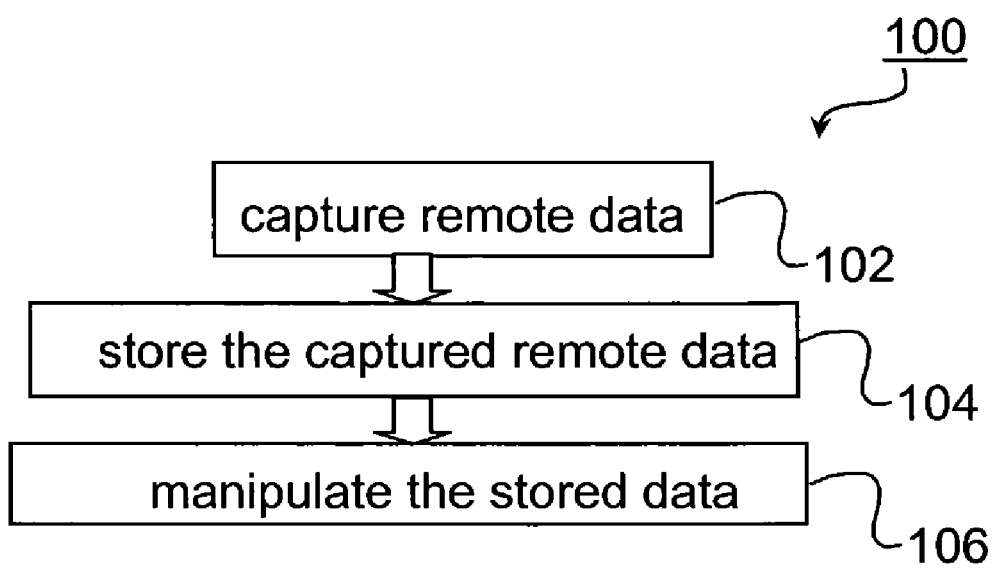
FIG. 2 is an overview of an ID authentication method in accordance with the present invention.
Figure 3:
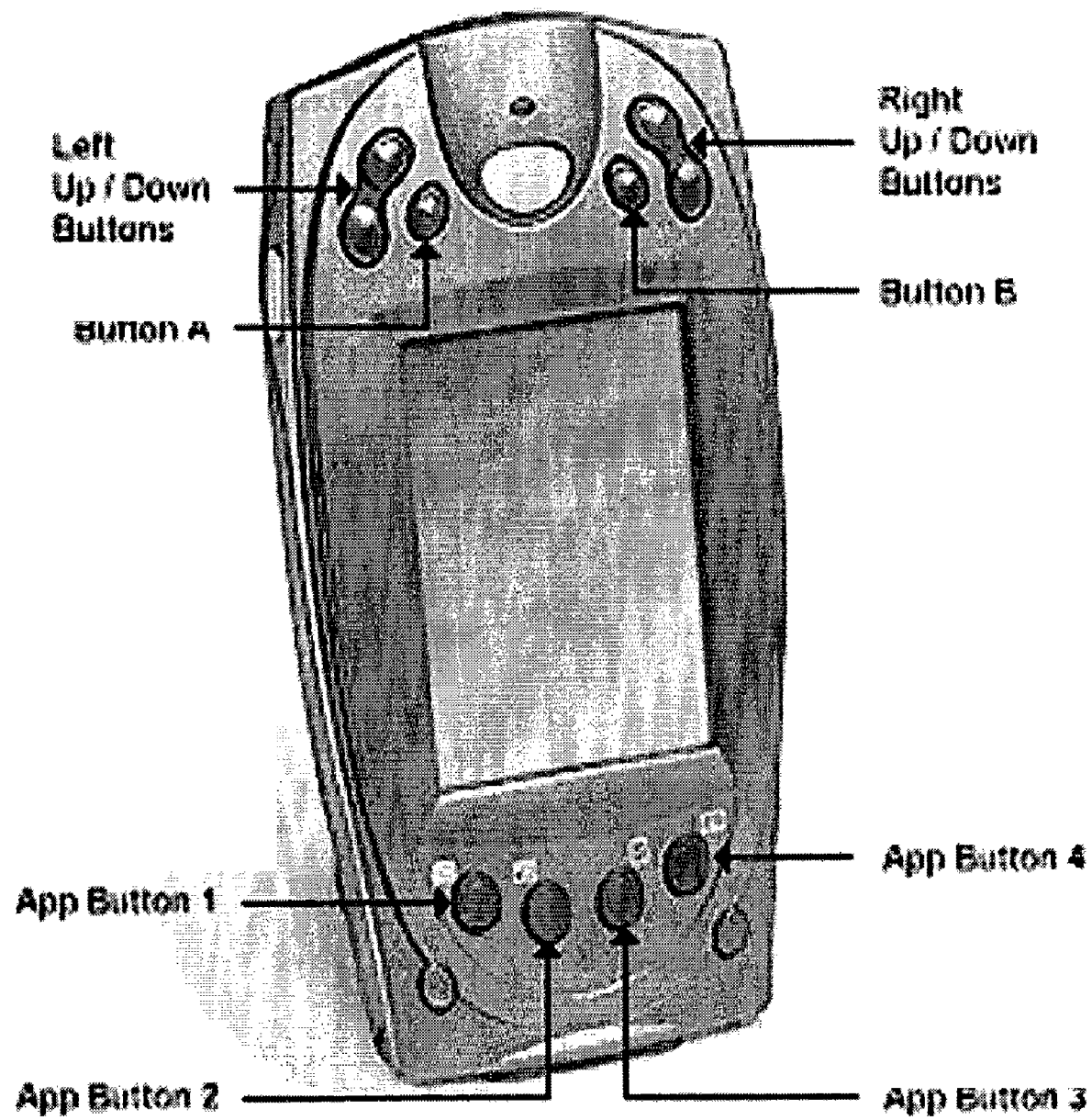
FIG. 3 illustrates a handheld device in accordance with an embodiment of the present invention.

As illustrated in FIG. 2, the method includes the steps of capturing remote data 102, storing the captured remote data 104, and manipulating the stored data 106.

TABLE 1

| Reference No. | Information |
|---|---|
| 112 | JURISDICTION (U.S. (STATE) OR CANADA (PROVINCE)) |
| 114 | GRAPHIC OR LOGO OF JURISDICTION |
| 116 | DOCUMENT TYPE |

TABLE 1-continued

| Reference No. | Information |
| --- | --- |
| 118 | NAMES AND ADDRESS OF INDIVIDUAL OF THE DOCUMENT |
| 120 | PARTICULARS OF THE INDIVIDUAL OF THE DOCUMENT |
| 122 | SIGNATURE OF INDIVIDUAL OF THE DOCUMENT |
| 124 | PHOTOGRAPH OF INDIVIDUAL OF THE DOCUMENT |
| 126 | IDENTIFICATION NUMBER OF DOCUMENT |
| 128 | DATE OF BIRTH (DOB) |
| 130 | US128 BAR CODE |
| 132 | MAGNETIC STRIP |
| 134 | ANSI-20.1; 1993 CHARACTER SET OR 2D BAR CODE PDF-417 |
| 136 | JURISDICTIONAL TEXT |

TABLE 2

| Information Captured |
| --- |
| License Number |
| Name (First, Middle & Last) |
| Date of Birth |
| Sex |
| Address, City, Province, Postal Code |
| Height/Weight |
| Hair Color/Eye Color |
| License Expiry Date |

TABLE 3

| Email Address |
| --- |
| Entry Keys Provided for: |
| Backspace |
| Clearing the Entry |
| First Name |
| Last Name |
| Toggling Domains |
| Toggling Domain Extensions such as .com, .net, and .ca |
| Consent |
| Proof of Consent |
| Simple Yes/No - send me information on future events/offers |
| Allows for signature capture |
| Data optimized to occupy minimal disk space |

Team members use the hand-held units to collect information on a consensual basis from driver's licenses of patrons at the establishment. They also collect email addresses and responses to survey questions, such as: "How many beers a week do you drink on average?" "What is your primary beer brand preference?" and "What University/College do you go to, if any?" At the end of the event, the team leader connects the unit to a phone line and the data is transferred in encrypted form to back-end servers over a dial-up Internet connection. While the unit is connected, any program updates are automatically conducted including new survey definitions, thereby allowing the data collection team to conduct location-specific or seasonal surveys. With the data residing on servers, the team leader then logs on to a relevant section of the site and creates a new event to which the data is assigned. Analysis can then be conducted on this data specifically or the whole data set collected to date. For example, the team leader can view the responses and other statistics by event type, such as Blind Data Promotion or event tickets giveaways, and/or location.

The system can be used in a similar fashion for other markets like automotive dealerships, real estate agents for open houses, or energy savings corporation representatives. The invention provides an age verification information product and their related loyalty and reward program data mining. The invention facilitates the capture of barcode and magnetic stripe age verification data from mobile readers. The invention can be expanded to become a gateway to gather consumer information, conducting field survey and gathering email addresses will allow a company to offer a far greater range of meaningful services to target clients. The various age-verification and data collection can virtually remove the possibility of human error in authenticating ID's while ensuring the accuracy and quality of data collected. The hand held wireless devices can track specific data that can be shared by appropriate parties through secured Internet communications.

In an embodiment of the present invention, the system includes a handheld unit that uses a docking cradle to upload captured information into the remote hosted database while using a proprietary software application, providing is a tool for cost effective, real-time communications of related functions and delivery of all reporting necessary to satisfy client needs, and provide a data collection gateway into customer initiatives including loyalty and reward programs for many industries such as breweries and tobacco companies. As through traditional loyalty programs, points or other special offers, can be awarded based on frequency of purchase and/or other criteria. These offers are tied to their unique ID or driver's license number enabling through one-to-one marketing. This will provide valuable information that to date has been virtually impossible to acquire. The invention facilitates the gathering, storing, management and representation of this information while respecting the requirements of both consumers and other regulatory as well as legislative standards by securely hosting the customer's collected data on servers.

The invention can significantly lower direct marketing costs through the use of the database information to target demographic specific customers, and provide a full loyalty and rewards program database management system. The invention establishes innovative initiatives to reduce the overall cost of identity verification for establishments by establishing a uniform policy on entrant ID verification, and ease of verification and authenticity of same for the first time creates a more efficient and productive business model for the establishment. No more guessing at the authenticity or validity weight of an ID.

By utilizing a verification system, establishments are able to conduct a customer appreciation direct mail campaign. Internet-based software facilitates the introduction of data-exchange for the purposes of direct mail and electronic mail marketing programs. A customer data list including complete driver license information can be collected for tens of thousands of patrons. Establishments are able to gather data on these patrons and identify those that are repeat customers, and run direct mail campaigns to these customers.

Additionally, security personnel of an establishment can use the date and time stamped patron data collected to assist police in identifying alleged assault perpetrators as well as assist police fraud squads and credit card company security to identify credit fraud rings. In tests involving over 200,000 driver's licenses, multiple results achieved in age authentication and verification have lead to hundreds of confiscated false ID's, patron data collected on an opt in/out permission base and enhanced ability for the security personnel to track establishment patrons on a dated and time stamped basis.

Challenges faced by brewers with a target demographic are twofold: one, the collection of customer data was traditionally conducted using a labor-intensive paper ballot system and secondly, the demographic target has a tendency to have identification from a residence that is not their residence during the school year and often changes form term to term therefore keeping accurate and up to date customer data is almost impossible. The invention integrates an email capture function into a portable handheld unit that is more relevant to the target demographic than a street address. Students have a tendency to keep the same email address all through their college or university years, making the task of keeping electronic addresses up to date easier than traditional addresses. Data collection teams can increase their accuracy of data collection while at the same time increasing the volume of unique customer names. Permission-based opt-in survey information and email addresses can be filtered into a back office for analysis purposes. From this database, brewers can use these addresses to promote special events called "database parties" at licensee establishments.

Several "special event" type data parties can be hosted using the system to collect and store patron information that can be later used for event success measurement purposes. The system offers businesses increased rates of data capture as with the previous system, reduced cost compared to previous systems, more accurate and reliable data collected than previous systems, and email capture on handheld unit allowing cost effective customer initiatives for transient college and university population.

If on a typical Thursday night, students make this their last stop of the night and as a result venue capacity is unfulfilled prior to 11 pm. In conjunction with the business's database, students can be invited to attend an event at a pub by email invitation sent out at 3 pm on a Tuesday night for a Thursday night promotion. The promotion can offer double their odds to win if they RSVP and in attendance by 9:30 pm Thursday night of the event. In addition, they can be put on a VIP guest list so they will not have to wait in the regular line. Upon arriving, they present their ID to the business rep and are given better odds of winning. For the first time, email can be sent out, RSVP'd to and attendance tracked to determine the success of the events value proposition. The capacity of the venue can be fulfilled much earlier in the evening than would normally been the case, resulting in significantly higher sales for the venue.

The invention enables the provision of system directed email invitations, clear and simple demographically-targeted messages, small sized rich media text, links to reservations, reservation tracking, as well as event advance notice for email response rate tracking, analysis of event quality, event response status, event attendance analysis, customer Information, event analysis, and sample demographics reports.

While customers can capture and harvest valuable information from consumers with the intention of remarketing back to a captive audience using the system, they should be able to prove proper due diligence and consent that they have received this consumer information with the consent of the person. Opt-in features and signature capture, as well as web enabled unsubscribe features help keep customers compliant and allow them to demonstrate to their brand loyalists, their desire to respect them as a customer.

The invention provides "signature capture" capability for consumer consent. Patrons will have to opt in to may choose to opt out when being surveyed so they will not receive any customer information unless they want to. Database storage is in a state-of-the-art secure facility to avoid potential data theft/hacking. Data is captured by & belongs to customers, it is their responsibility to comply with privacy legislation with how they collect, host and use the data collected.

The invention can provide special event database capture, and the needed tools for the aforementioned industries in order to meet tactical needs to enhance, maintain and acquire new brand or product loyalists. These tactical needs can be fulfilled by the capture, integration into CRM initiatives and the ability to leverage this information and technology to further drive consumer loyalty through event participation and value offerings.

The invention has the ability for businesses to reach consumers through customer communications and through special offers entice consumers to fill out online surveys so that businesses can gauge the relevance, results or desirable improvements to enhance the continued success of ongoing and future promotions and product offerings.

In today's marketplace all companies are looking for new ways to maintain and grow their market share. This is particularly true in mature markets such as the beer industry. Beer companies for example need to use a push-pull marketing scenario. They need to have their beer "on tap" at licensed establishments and also need to convince the people visiting those establishments to order their beer instead of their customers. The invention combined with a loyal rewards program for consumers accomplishes both requirements.

The invention includes an ability of retaining patron information initially simply for responding to the issues of; verification and authentication of identification, recognizing "double dipping" as well as responding to the banned patron requirements of the hospitality industry.

Additional implementations of the invention include automotive dealers for rapid capture of driver's license information, verification, database development, test drive tracking and new service customers in order to facilitate more cost effective communications as well as offering the ability to rate their customer experience and drive valuable feedback to the people determining where marketing dollars are being spent as well as improved overall communications with their existing customer base. Other implementations include all retail establishments involved in the sale of alcohol products, all retail establishments involved in offering internal credit facilities to their customers, consumer home delivery of ID sensitive or age restricted products and services, car rental agencies, parking control, and service to the long haul companies allowing backend verification of all driver's against a Department of Motor Vehicle database once per year.

The invention provides customer requirements for capturing consumer data including portable handheld data collection unit software applications, embedded consumer information on Identification found on the barcode or magnetic stripes on ID's such as a driver's licenses, consumer consent either by a simple "YES/NO" or signature capture for due diligence proof of consensual consumer opt-in for customer relationship management (CRM) initiatives. Surveys are conducted using the handheld devices so establishments can get immediate filed response from consumers. Collect email addresses or telephone numbers, dial up and uploading of data collected using a dial up Internet account to our back office servers, back office software applications allow a business to: review the aggregate or specific information collected in the filed by demographic information or survey data collected, conduct on line surveys with consumers, send rich text emails targeted to their customers specific requests for upcoming event information, invite customers to special events or offer other special promotions, track RSVPs of special offer or event invitations, track special offer or event attendance as well as event attendance relative to RSVPs, ASP Revenue, secure Hosting of Collected Data.

Revenue can be on the rental of hosted services for housing data collected in the field using the portable handheld date collection unit with o1utsourced management of hardware, software, and security relating to collected data. Dial up accounts can be implemented as an upload gateway to the back office servers with various levels of access to information collected from the end consumer, company field representatives, territory managers to senior management and sales and marketing staff.

Electronic rich text email is an option to be used with the back office services. CRM initiatives can be remotely managed using our hardware and software combinations for electronic direct mail marketing. Internet, Extranet and Intranet sites can all be maintained on this system for our customers.—Customers will be able to use "opt-in" and "opt-out" services so they can keep their mailing lists up to date as well as compliant with the wishes of their customers as well as compliance to regulatory and legislative requirements.—services such as database sweeping are offered to our customer for use so they may contact third parties whether they are government or private sources of obtaining current and accurate data relative to their consumer data base, characterized as an "accuracy" service since holders of personal information have a responsibility to maintain accurate information. "Sweeping service" again smacks of data mining. His isn't so much an issue as to what you're doing but how it is characterized. This service will help the "holders" of the personal information to maintain the accuracy of their information holdings.

As well, systems such as loyalty and rewards programs may be used by businesses to offer value to consumers for being brand loyalists and maintaining their loyalty to the brands. Redemption and Auctions can be used as an augmentation of the loyalty and rewards programs, businesses are able to use this system whereby their consumers can redeem prizes or special offering based on value offered and received and or time related special offers In addition, a scratch and win having an algorithm that allows for better odds for loyal patrons can be implemented, as well as manual name and license number entry for jurisdictions that do not have barcodes or magnetic stripes.

Capturing License Data

License data is captured from the encoding on license identification to determine the authenticity of the ID by checking the encoding, provide data to validate against the information printed on the ID, the bearer of the ID, and quickly and accurately record the information contained on the ID. Three different types of encoding are typically used on driver's license identification. Each encoding standard can be easily identified. Many jurisdictions use more than one form of encoding on identification. Each encoding standard has different data storage requirements and capacities. Provided consent, the encoding format with the highest storage capacity should be used as the source for the information that one captures, since some encoding formats may not contain all the information that you require.

A prioritized list of the typical encoding formats in decreasing order of storage capacity includes 2-D Barcode, 3-track magnetic stripe and 1-D. The barcode reader can read 1-D bar-coded licenses. However, so little information is stored in the 1-D barcode that it can only accurately aid in determining the authenticity of the encoding. In order to capture the information, one will use manual data entry instead of scanning the 1-D barcode.

Figures 13, 14:
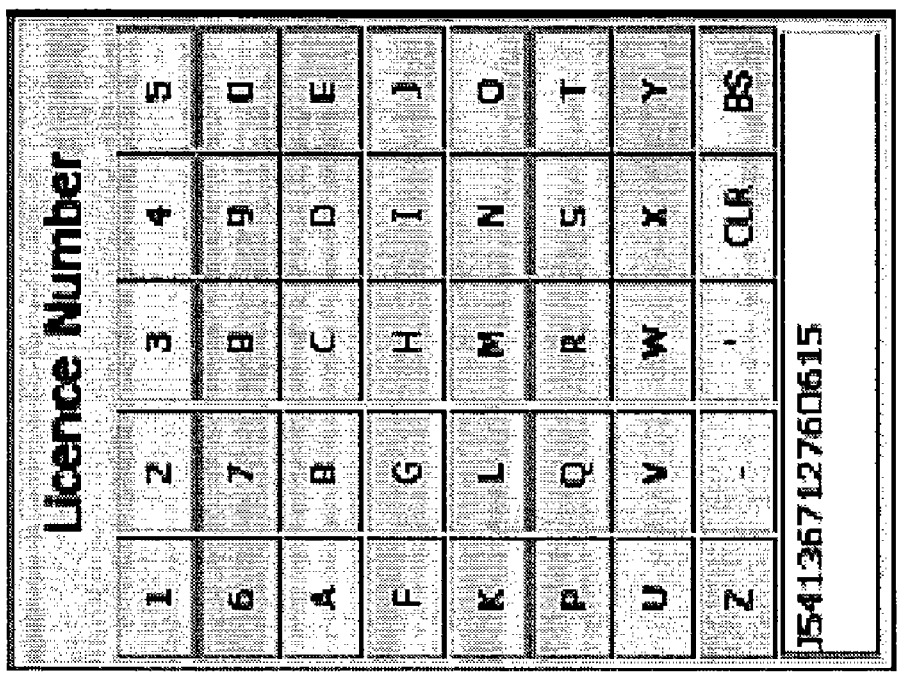
FIG. 13 illustrates a manual entry general information screen.
FIG. 14 illustrates a manual licence number entry screen.

As illustrated in FIG. 13, to add a license manually simply press the "General" button. For each of the fields, a drop-down list is provided to aid the data entry process. For navigation, pressing the "General" button from the general info screen aborts the manual license entry operation and returns you to the main ID screen. In general, the Next and Previous buttons located at the bottom of the hand-held unit are used to navigate through the Manual License Entry screens. However, pressing the Previous button in the General Info screen does nothing. Pressing the Details/Save button from this screen will take you to the License Number screen, illustrated in FIG. 14, if a license number has not been entered; otherwise it will take you to the Details Summary screen, illustrated in FIG. 17. Once you have filled in all the data fields on the General Info screen by selecting an item from each of the drop-down lists, press Next to proceed.

Use the stylus and keypad to enter the license number. Recheck entry to ensure properly differentiated letters and numbers, in particular 1's and l's, 0's and O's, and 5's and S's, on the license. Navigation: Tapping CLR on the keypad will clear all information entered in the data field. Tapping BS once on the keypad will erase the last character entered in the data field. The BS key functions similar to the Backspace key on a regular keyboard. Pressing the General button from this screen will take you to the General Info screen. Pressing the Details/Save button from this screen will take you to the Detail Summary screen provided that you have finished entering the license number. Press NEXT to proceed to the First Name entry screen.

Use the stylus and keypad to enter the patron's first name. As you begin typing, you will notice the scroll list looking for a match from a list of common names based on the letters you have typed. If, as you type, you see the completed name in the scroll list you can select the name by tapping twice on it in the scroll list to populate the first name field. Recheck your spelling with the information printed on the patron ID. If the information is cannot be easily read, ask the bearer of the ID to assist you.

Figures 15, 16:
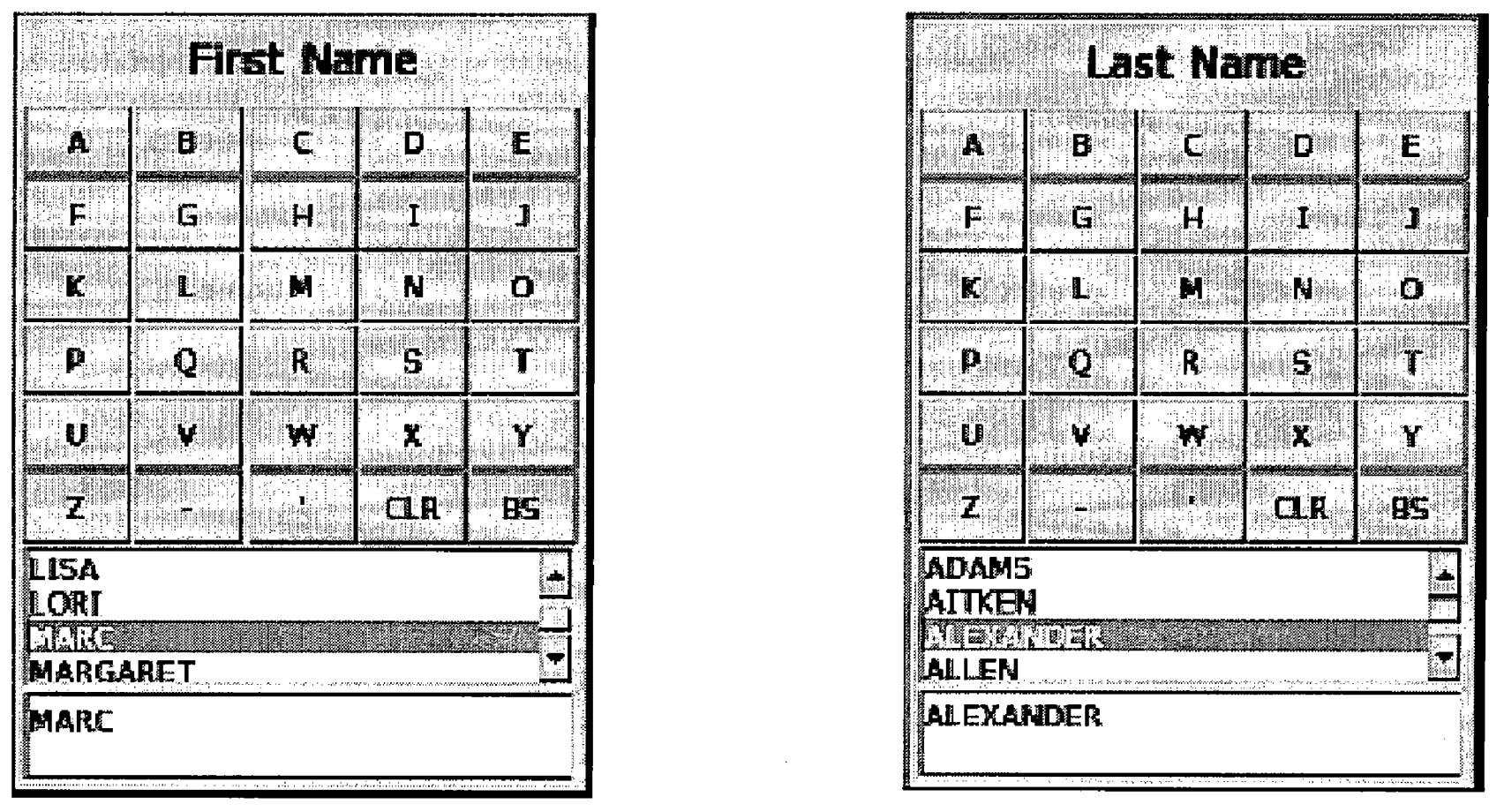

Pressing the General button from this screen will take you to the General Info screen. Pressing the Details/Save button from this screen will take you to the Detail Summary screen. Press NEXT to proceed to the Last Name entry screen. The Last Name entry screen operates in the same manner as the First Name entry screen, as illustrated in FIG. 15. Navigation: Pressing the General button from this screen will take you to the General Info screen. Pressing the Details/Save button from this screen will take you to the Detail Summary screen. When you are finished entering the Last Name, press Next to proceed.

Figure 17:
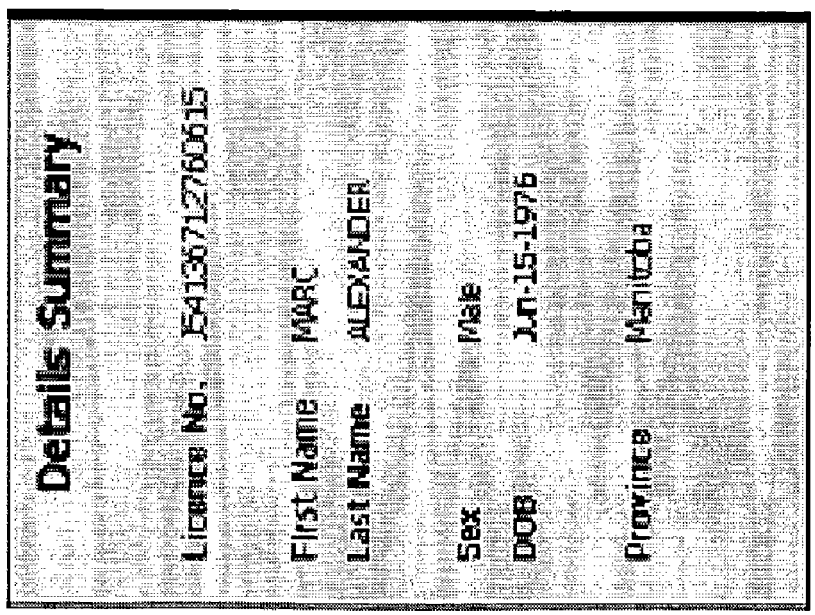
FIG. 17 illustrates a details summary screen.

The final screen in the manual entry process is the Details Summary screen, illustrated in FIG. 17. All information entered during the current manual entry session is displayed for review. If you need to make any changes, use the Previous and Next buttons at the bottom of the unit to move through the screens. When you are finished editing, if required, press the Details/Save button to go to the Details Summary screen. Review the information again, and then press the Details/Save button to save the license data. Navigation: Pressing the General button from this screen will take you to the General Info screen.

"Tap to Win!" Contests

Figure 18:
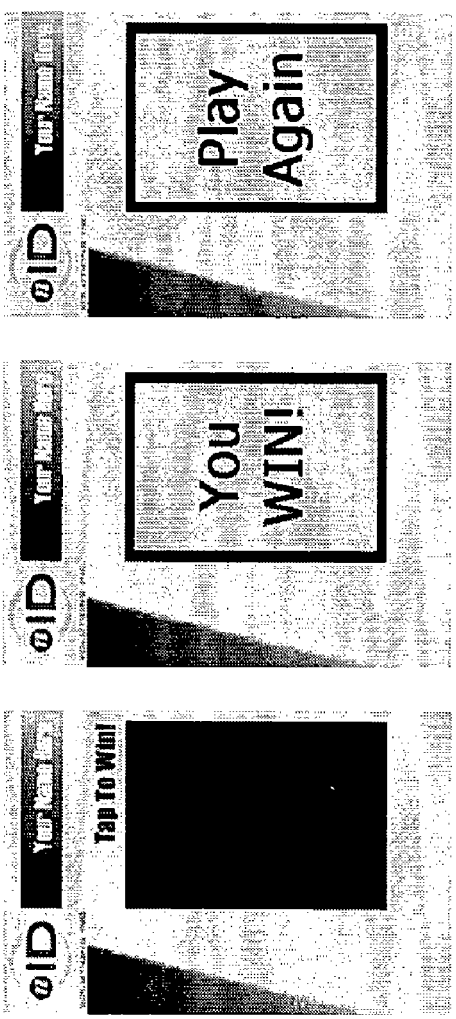
FIG. 18 illustrates "Tap to Win!" contest screens.

As illustrated in FIG. 18, to launch a "Tap to Win!" contest, press either of the buttons labeled "Tap to Win!"

from the main ID screen. The "Tap to Win!" screen is displayed. Using the stylus, tap "Tap to Win!" The result is displayed on the screen. Pressing any one of the "Tap to Win!" buttons will return you to the main ID screen. Awarding prizes based on operator defined odds. For example, a beer company might have 10 t-shirts to give away at an event and the attendance may be 100. In this case, they would want to set the odds to one in ten to be statistically confident that they can give every attendee a chance of winning.

The odds can be reconfigured at any time. With a paper based system, once the tickets are printed, the odds cannot be changed. The look and feel of the scratch ticket can be easily customized. The operator only has to have a single mobile computer instead of hundreds of scratch tickets. Since the consumer "scratches" the ticket on the mobile computer, fraudulent winning tickets cannot be created. A mobile computer is used to award the prizes based on operator-defined odds. Prior to application startup, the operator will type in the odds. Once the application is running screen(s), it can be used for the prizing. As illustrated in FIG. 18, the operator would tap in the black rectangular area of the first screen and then depending on the odds and whether that person won or not, either the second or third screen would be shown.

The system provides advantages including fulfilling regulatory compliance with ID verification initiatives and capturing consumer information assisting in their CRM initiatives. The system assists in maintaining and increasing market share, increasing profitability through brand loyalty marketing, enhancing existing marketing initiatives, and provides immediate Analysis of and availability to the data generated by their Marketing efforts. Customer management done online with a small portable unit easily connected to the Internet for back Office data analysis. It identifies "double-dippers", maintains a "banned/VIP" list or custom messages, and provides customer survey support, an integrated bar code & magnetic Stripe reader, email address capture, signature capture, and a large data storage capacity.

The system facilitates single source communications and marketing of all age verification related management services, captures strategic information from consumers for clients to leverage their advertising, marketing, CRM and loyalty and reward program strategies, and the use of strategic alliances to enable rapid deployment of new products.

Venues and businesses have the ability to demonstrate not only compliance with legislation but good corporate governance with being able to display and effect due diligence proof, therefore benefiting their best business practices but also their proactive approach that they can then leverage into good public relations within the community. The invention is easy to use for untrained data collection labor. There is a high rate of consumer data collection ability of the system as well as an ability to quickly and cost effectively display captured data to the business management team in a more timely manner than a paper ballot system.

The invention enhances the profitability, cost effectiveness, efficiency, and quality of the ID experience for customers of the verifier and the identity verification products and services community. The invention can incorporate loyalty and rewards programs. Administration is quick, simple and done on an automated basis enabling costs to clients to be kept as low as possible. The data provides detailed and accurate information on the target market accounting of charges relative to the data requested, thus the mountains of support documentation clients received previously through alternative channels are no longer needed. It can become so simple that the acceptance and transmission of the data can become the invoice and authorization for payment.

Verifiers and other potential clients can take advantage of this simplified yet very effective process for their identity verification products and services requirements. A verification is performed, the data downloaded, supported by 1d and 2d reading to ensure accuracy, which in turn is posted on the exchange providing accurate information making it easy to receive data and thus allocate advertising resource dollars more efficiently and cost effectively.

Advantages of the system include accurate and efficient capture of industry-specific personal consumer data in a manner which complies with industry/geographically-specific privacy legislation, rapid transfer of such data to data storage, electronic use of such data for industry-specific loyalty/rewards programs, electronic use of such data to drive consumers to desired locations, electronic analysis of target consumer demographics and effectiveness of loyalty/rewards programs, speed and accuracy of data capture, secure data transmission to data storage, online analysis of data, e-marketing engine for contacting client's customers, and management of customer profile by establishment.

Global Rules

Embodiments of the present invention can further include a system for rewarding and identifying customers based on flexible rules for mobile computers utilizing the management of customer profiles by an establishment. The system can provide a mobile electronic means of identifying particular consumers based on an encoded form of identification with a operator customizable message and rewarding such consumers with flexible criteria.

Although company specific loyalty and rewards cards have been around for many years, there has been no attempt to use a standard form of identification such as a driver's license to identify consumers by several companies and tie multiple company-specific customizable messages, such as GOOD CUSTOMER or BANNED FROM THIS STORE, to each. Furthermore, there is currently no way to easily set flexible rewards in varying degrees of granularity down to a consumer specific level. For example to set the rule that any consumer who comes into the store between the hours of 4 PM and 4:30 PM and is a female between 5'-5" and 5'-8" tall from a particular city will get 10% off their purchase.

Each company using the system will have an account online which will allows them to associate a particular main and supplemental message such as a VIP, Frequent Visitor or BANNED, or Bad credit with a particular consumer, create flexible rules, such as any consumer who comes into the store between the hours of 4 PM and 4:30 PM and is a female between 5'-5" and 5'-8" tall from a particular city will get 10% off their purchase, and be capable of uploading the rules and consumer specific messages to the mobile computer over the Internet.

Once the mobile computer has the list of consumer specific messages and the appropriate rules loaded, the hand-held computer will identify any consumers to whom a customizable message has been assigned or who are eligible for the rewards defined by the rules. Each time a piece of ID is processed by the mobile system, a time stamped record is stored on the unit. This data is then uploaded to a central server the next time the mobile computer is connected to the Internet so that a history of consumer rewards or denials can be tracked.

Multiple companies can use same encoded card to identify and reward consumers and flexible rules can be created online and uploaded to the mobile computer verifying the IDs. By allowing multiple companies to use the same ID card, state or country wide banned lists can be used, and a digital record is kept of the consumers as their ID is processed by the mobile computers thereby tracking consumer reward/denial history.

Double-Dipping

Embodiments of the present invention can further include a system for identifying multiple attempts to utilize a single piece of identification to gain access controlled by a mobile computer. The system provides a solution to the problem of identifying "double dippers" or multiple people trying to get restricted access using a single piece of identification or multiple copies of the same piece of ID.

A hand-held computer will be used at the restricted entrance to verify the IDs. Each time an ID is processed, the computer determines whether someone has already been admitted to the restricted area by using that ID and if so, denies access. When a person leaves the restricted area, the ID is scanned and removed from the internally stored list of IDs in the restricted area so that the ID can subsequently be used to gain access without being denied. An algorithm stores the IDs that have been processed and compares any new IDs to those processed.

The system takes the guesswork out of the process. By electronically identifying multiple attempts to use the same piece of ID, the process is generally foolproof and consistent.

Efficient Email Capture

Figures 4, 5:
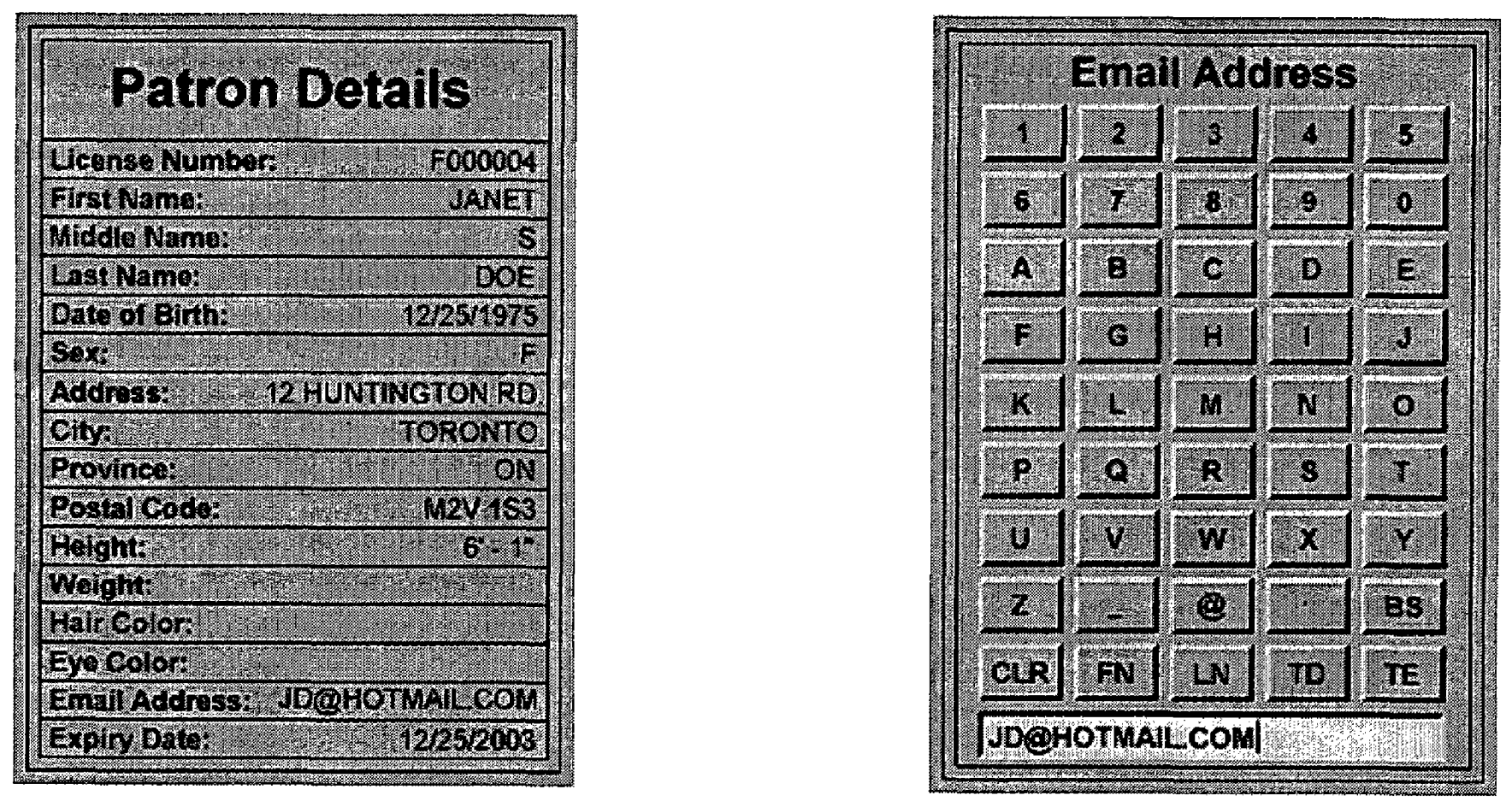

Embodiments of the present invention further include a method of capturing consumer email addresses in an efficient way using mobile computers. As illustrated in FIG. 5, one can either enter the email address directly by clicking on the appropriate characters or you can use the following buttons illustrated in TABLE 4 to speed up the data capture process.

TABLE 4

Capture Buttons

FN - Clicking this button inserts the patron's first name as read electronically from the ID card.
LN - Clicking this button inserts the patron's last name as read electronically from the ID card.
TD - This button allows you to toggle between some common domain names. As you click it, the domain cycles through the list of standard domains.
TE - This button allows you to toggle between some common domain extensions such as .com, .net, .ca. As you click it, the domain extension cycles through the list of standard extensions. The following buttons can be used for clearing data:
BS - This is the backspace key and deletes the previous character
CLR - This button clears the entire email address entry The mobile computer allows for the data encoded on 1D/2D barcodes or magnetic stripes of various forms of identification to be read. As such, the consumer's first name and last name will typically be known by the time the email capture screen is loaded thereby eliminating the need to re-enter the name if it forms part of the email address. In addition, the user interface has been designed such that the other portions of the email address can be captured with a couple of clicks. The functionality of the screen is also highly conducive to use on web pages and other forms of electronic media where it can be packaged as an ActiveX control.

Multimedia Presentation Involving Consumer Data Captured with Mobile Computers

A visually appealing means of selecting a random winner from a group of consumers who have provided their personal and preference data as captured using mobile computers. The winner selection process is electronic and more visually appealing for the consumers, and since the consumer data was captured electronically, there will not be an issue of illegible details on the winner, which would make verifying the winner virtually impossible.

Figure 20:
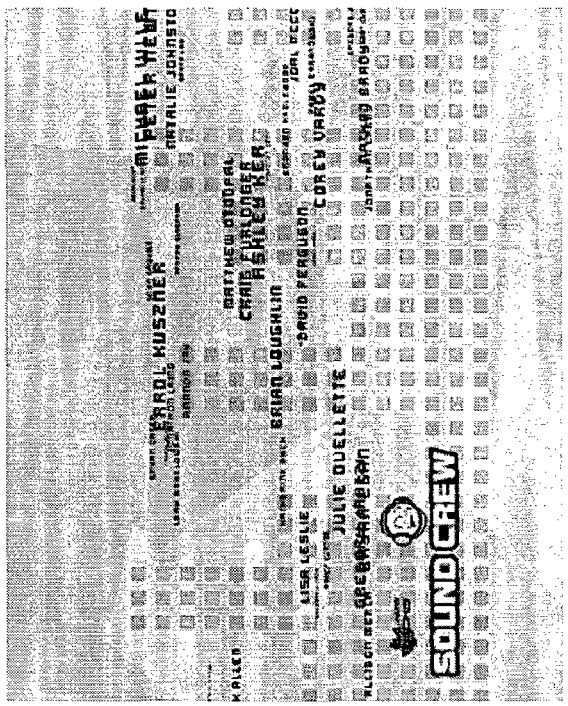
FIG. 20 illustrates consumer names being displayed.

The consumer personal and preference data is captured using hand-held computers. Whenever possible, the data encoded on driver's licenses is read to speed up the data capture process. When the random draw is to be performed, the mobile computer is docked to a notebook computer and the names transferred over. An application on the notebook machine then generates the list of consumer names along with the winner's name. This data is then used by a flash presentation that is displayed on a plasma screen connected to the notebook. The flash presentation appears as illustrated in FIGS. 20 and 21.

Figure 21:
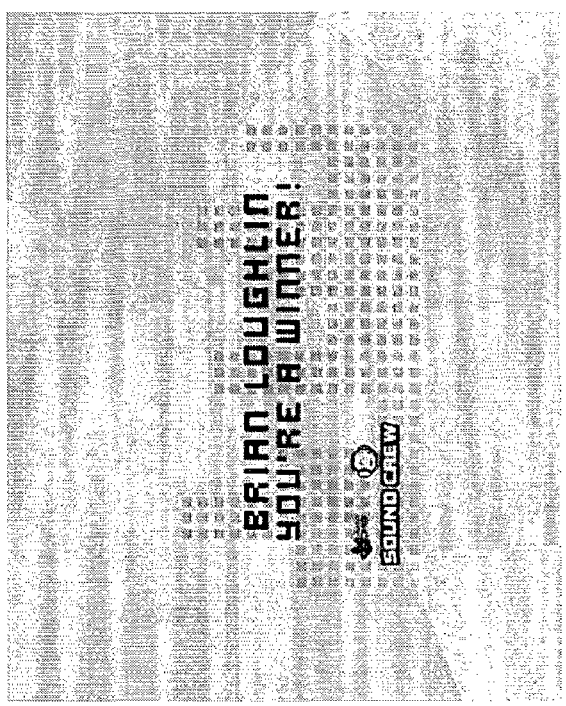
FIG. 21 illustrates only the winner's name shown.

FIG. 21 illustrates consumer names being read and displayed. When all the names have been loaded, the names of the consumers who have not been chosen as the winner begin fading until only the winner's name is shown, as illustrated in FIG. 21.

Capture and Online Presentation of Consumer Photographs Linked to Driver's License Data The invention can take digital photos of consumers and tie those images to one or more consumers whose personal and preference data has been captured. Previously, the digital images could not be referenced to one or more consumers. The invention provides a digital means of connecting one or more consumers to a digital image. The user interface allows for quick association of an image with one or more people.

Figure 19:
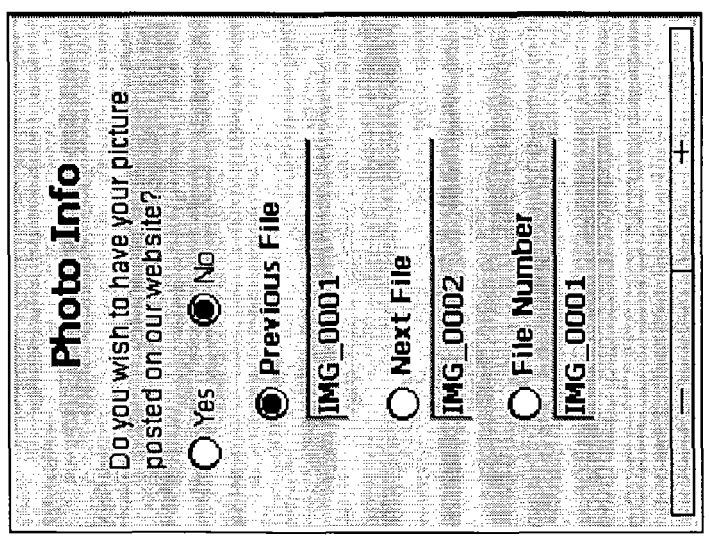
FIG. 19 illustrates a photo info screen.
Figure 24:
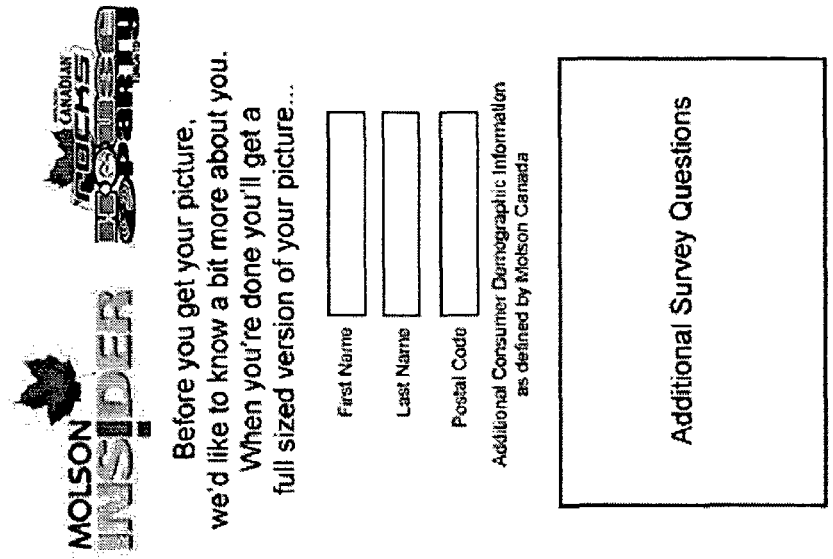
FIG. 24 illustrates; an end-user email survey.
Figure 23:
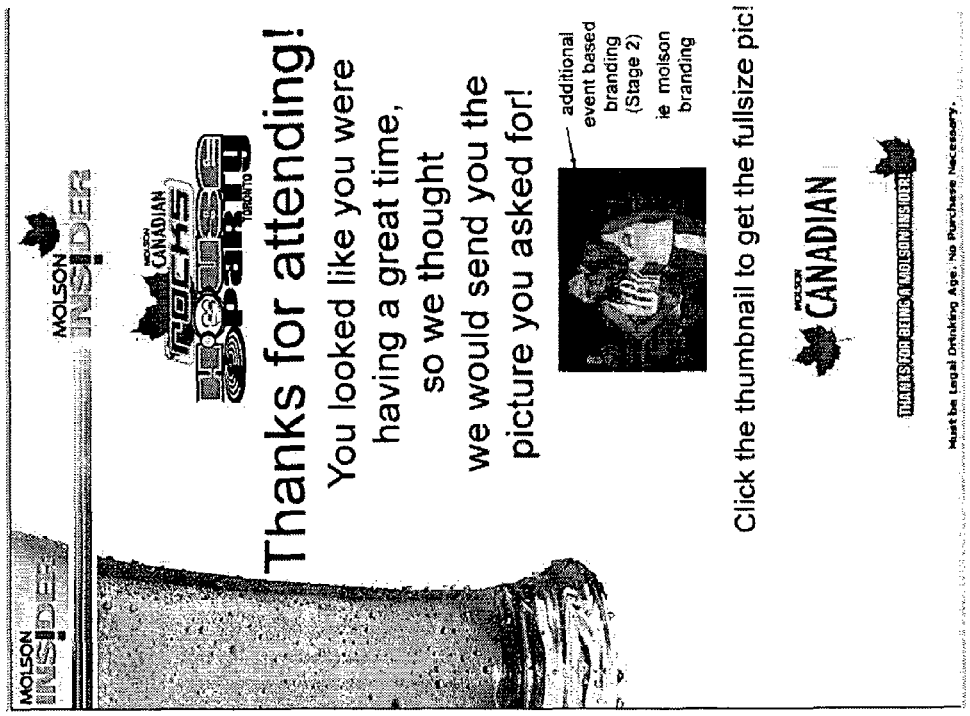
FIG. 23 illustrates an end-user email.
Figure 25:
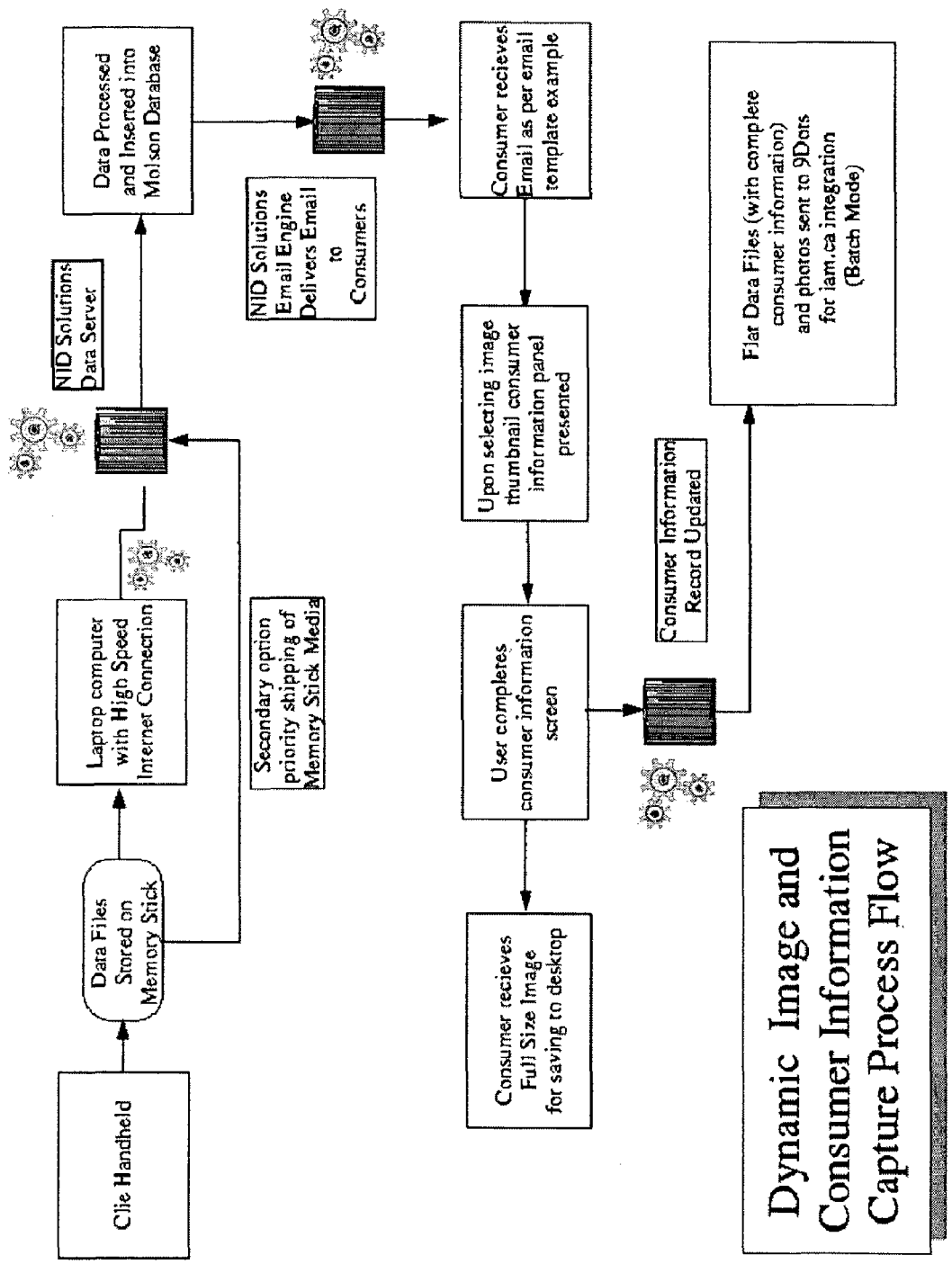
FIG. 25 illustrates a dynamic image and consumer information capture process flow.

The operator approaches a consumer or group of consumers, takes a digital image and then individually collects their personal and preference data using a mobile computer, using the data encoded on driver's licenses wherever possible. After collection of each consumer's data, the screen illustrated in FIG. 19 is presented that allows the operator to associate the image number with the consumer. When a photo is taken of a group of individuals, the "Previous File" option may be used, otherwise, if it is of a single person or for a new image, "Next File" will be selected. This procedure works since the digital camera increments the image name by one each time a shot is taken. For situations where the image number is out of sync with that on the camera, the "File Number" option can be selected and the "+" and "−" buttons at the bottom can be used to set the image number so that the two are synchronized again.

The images on the camera's flash card are uploaded with the consumer data and the two are matched up based on the image names. NOTE: Before the mobile computer's application is started, a three digit flash code as found on the camera's flash card is entered. The images are then renamed to be prefixed by this code to allow images from multiple cameras to be uniquely identified; otherwise two cameras may have an image called IMG_001.jpg.

Efficient Signature Capture and Storage on Mobile Computers

Generally consumer signatures are captured on paper and those that are electronically captured store the signature as an image thereby consuming a lot of disk space. Signatures are captured and stored electronically allowing for rapid retrieval as compared to traditional paper based signatures, and digital signatures are stored in efficient binary format as opposed to images to conserve disk space. Sufficient signature points are stored to preserve the cursive nature of the signatures.

Figures 6, 7:
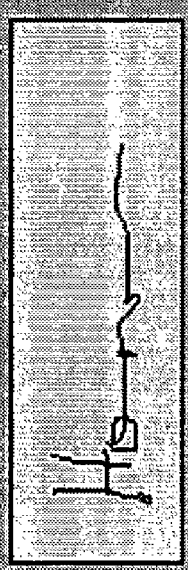
FIG. 6 illustrates a signature capture screen.
FIG. 7 illustrates customizable survey questions with drop down lists.
Figure 9:
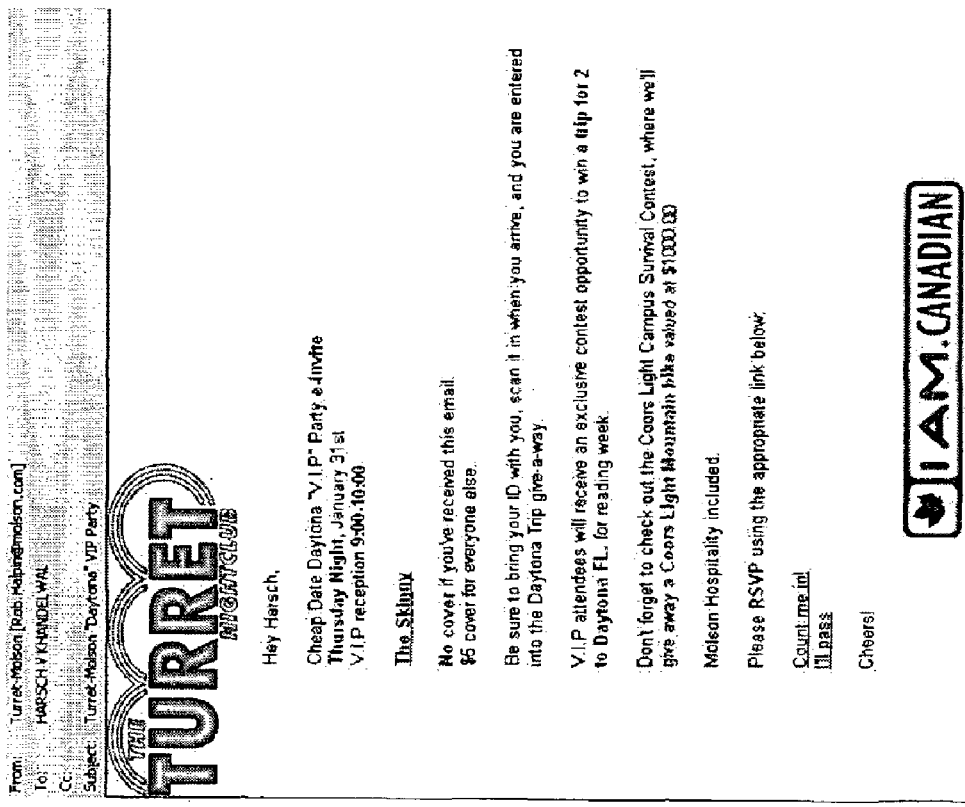
FIG. 9 illustrates an event response status window.
Figure 10:
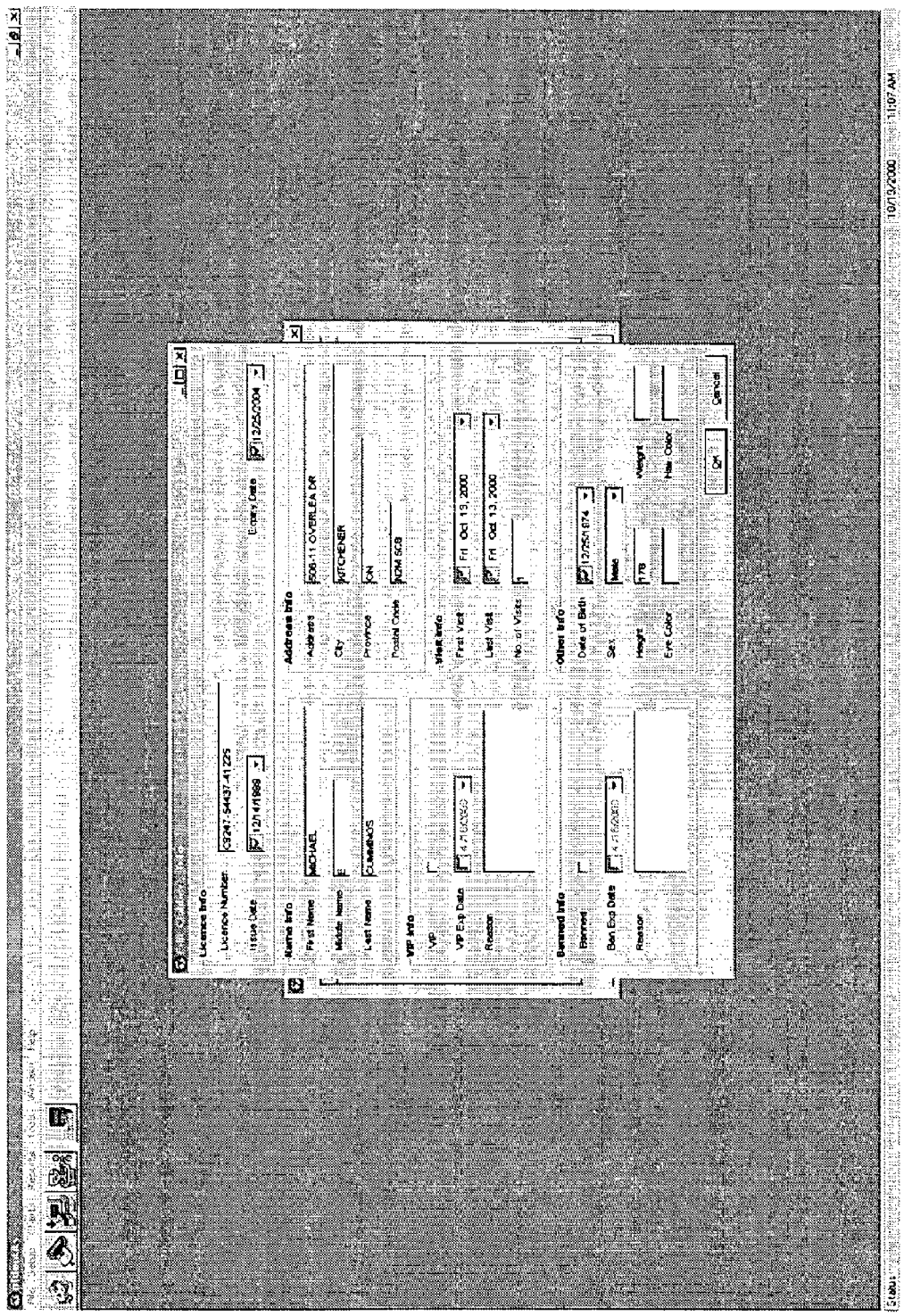
FIG. 10 illustrates a customer information window.
Figure 11:
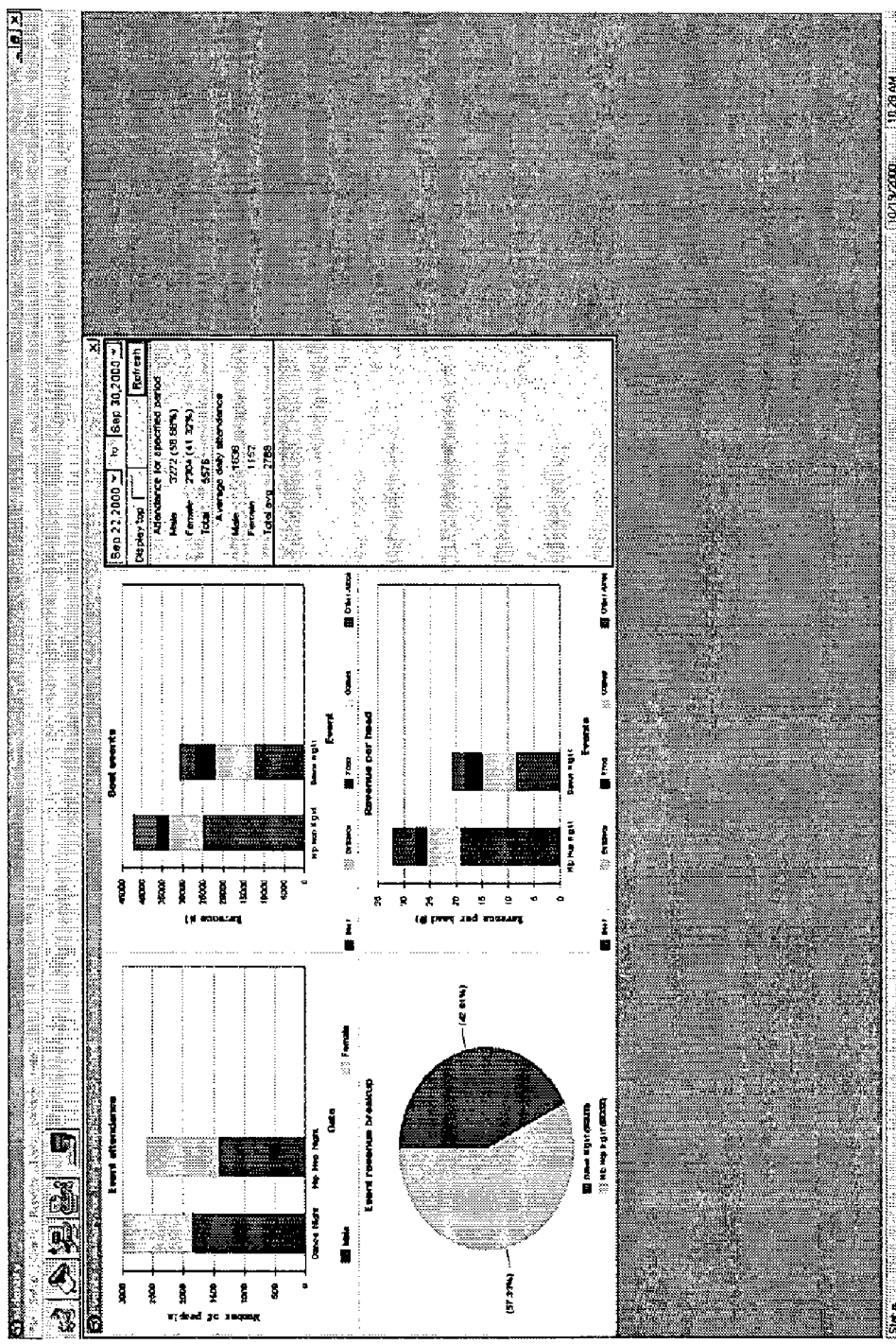
FIG. 11 illustrates an event analysis window.
Figure 12:
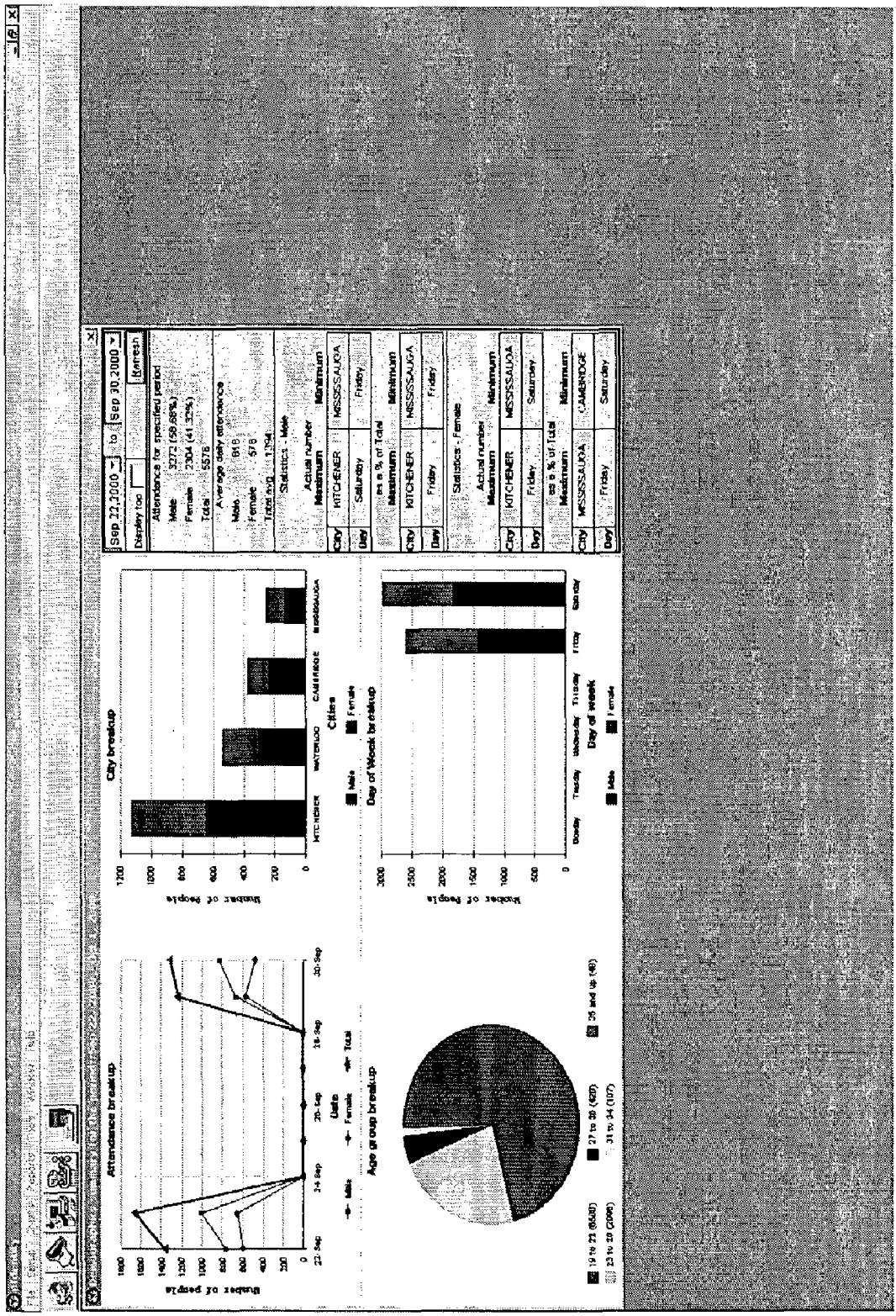
FIG. 12 illustrates a sample demographics report window.

A sample signature capture screen is illustrated in FIG. 6. As the consumer signs, points along the signature are stored along with any instances where the stylus is returned in contact with the screen after being lifted. This data is stored in a binary file in the following format illustrated in TABLE 5.

TABLE 5

Data Storage Format

Number of Points (n)
X1Y1
X2Y2
.
.
.
XnYn
Index1
Index2
.
.
.

Index1, Index2 and so on are the index of the points for which the stylus was placed in contact with the screen after a lift. For example, if Index1 is 10, that would imply that the 9th point (since the index is zero based) was one for which the stylus was returned in contact with the screen and as such should not be joined with a line to the 8th point. The algorithm that stores the signature points retrieves more points than are returned by traditional Mouse Move windows messages to allow for more cursive signatures. Once the binary file is stored, a desktop application reads the file and creates a bitmap image of the signature to allow for visualization. Storage capacity is not much of an issue on the desktop machine.

Mobile System for Efficient Demographic Data Collection

Figure 22:
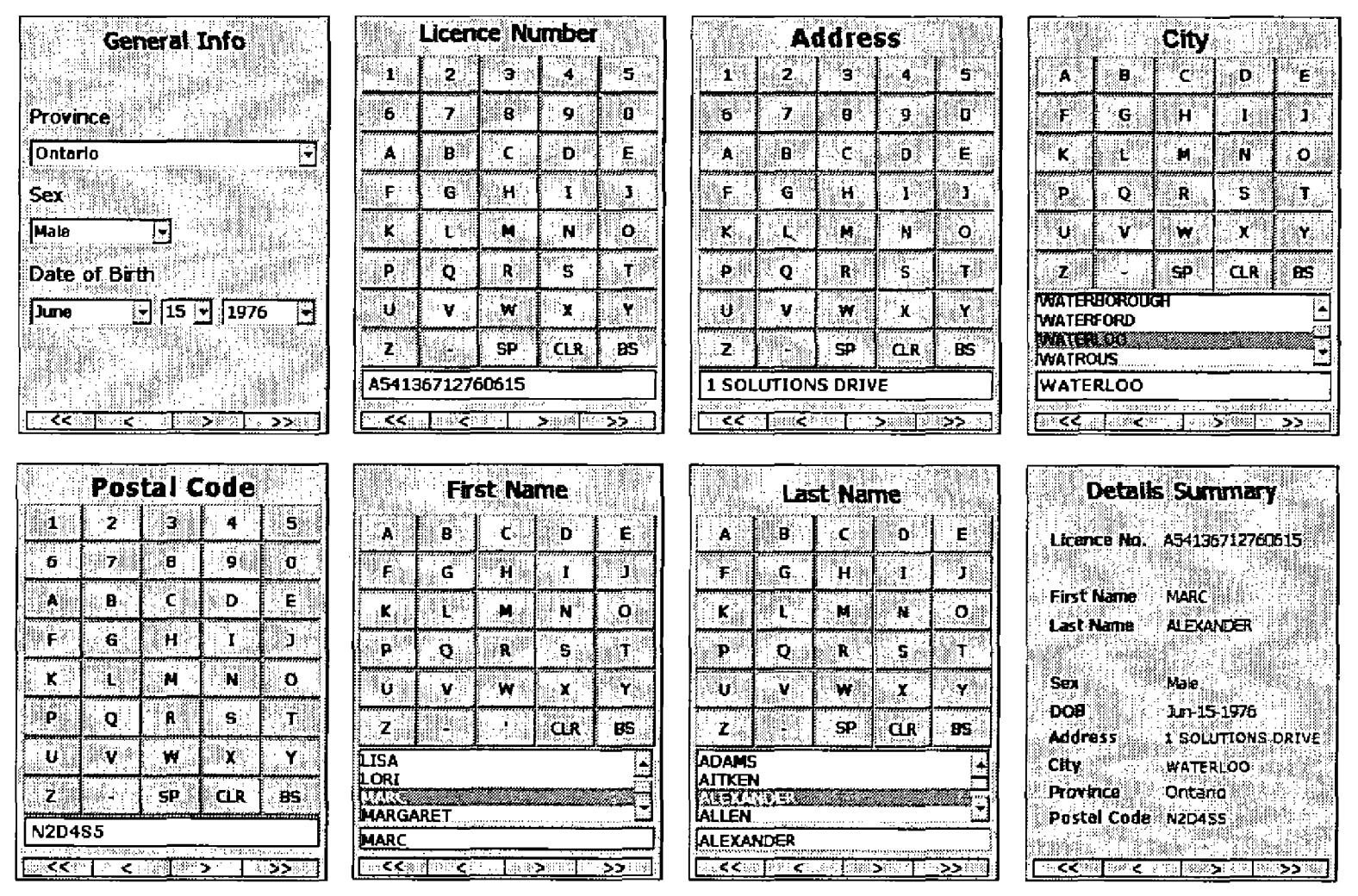

FIG. 22 illustrates eight screens used to capture the demographic data. The four buttons along the bottom of each screen are used to navigate to the first, previous, next and last screens (from left to right). Each screen performs the necessary validations to ensure accurate data and minimize data entry errors.

The City, First Name and Last Name screens are preloaded with a list of the top 500 values appropriate to each. These values are read as the application loads from three text files. As the operator types in any of these three screens, the closest match from the list is highlighted and at any point the operator can double click on a value in the list to pop that entry into the field and eliminate having to type the whole string. Once the details have been entered, the details screen displays the data entered for verification. At this point the operator can either commit the data or move to a previous screen and correct an error.

Advantages Include data immediately stored in electronic format thereby eliminating the need to subsequently key in data as in paper based systems. Several time saving features allow for rapid data capture as compared to traditional electronic data capture techniques. Screens are designed to allow the operator to enter as much or as little information as desired.

Kiosk for Capturing Industry Specific Consumer Personal and Preference Data with or without Driver's License Data Capture The kiosk will allow consumers to enter their personal data by having the machine read the encoded data on an identification card (data can be read from magnetic stripes, 1D barcodes and 2D barcodes). If an ID card is not available, the details can be keyed in with a keyboard along with responses to a customizable survey. The kiosk will transfer the data to a remote data store by dialing out to the Internet at scheduled times.

Although the present invention has been described in considerable detail with reference to certain preferred embodiments thereof, other versions are possible. Therefore, the spirit and scope of the appended claims should not be limited to the description of the preferred embodiments contained herein.

What is claimed is:

1. A remote information capture system for the capture, storage and manipulation of remote information, the system comprising:
    (i) a portable remote information capture device located at a remote site for capturing remote information comprising consumer personal data and consumer preference data, the portable remote information capture device comprising:
        a reader for capturing the consumer personal data encoded on a consumer's identification (ID); and
        an entry module useable by an operator for entering the consumer preference data;
    (ii) a computer system accessible by the portable remote information capture device operative to store the captured remote information, the computer system comprising a global rules manager module for creating one or more global rules and managing one or more rewards based on the one or more global rules, the one or more global rules being uploaded to the portable remote information capture device; and
    (iii) a computer program operative to manipulate the captured remote information, the portable remote information capture device further comprising a module for identifying a consumer who is eligible for the one or more rewards defined by the uploaded one or more global rules, the module identifying the eligible consumer based on at least the captured remote information and the one or more global rules uploaded to the remote information capture device.

2. The remote information capture system as claimed in claim 1, wherein the reader includes a bar code reader, including a reader for a 1D barcode and a 2D barcode.

3. The remote information capture system as claimed in claim 1, wherein the portable remote information capture device is a wireless device for accessing the computer system wirelessly.

4. The remote information capture system as claimed in claim 1, wherein the remote information capture system further comprises a verification module for verifying the captured consumer personal data.

5. The remote information capture system as claimed in claim 1, wherein the portable remote information capture device further comprises a signature capture module for capturing a consumer signature.

6. The remote information capture system as claimed in claim 1, wherein the reader includes a magnetic strip reader.

7. The remote information capture system as claimed in claim 1, wherein the portable remote information capture device further comprises a consumer interface for consumer participation.

8. The remote information capture system as claimed in claim 1, wherein the portable remote information capture device further comprises a fraudulent use detection module for detecting fraudulent uses based on the remote information.

9. The remote information capture system as claimed in claim 1, wherein the portable remote information capture device further comprises a privacy consent module for capturing consumer privacy consent approval.

10. The remote information capture system as claimed in claim 1, wherein the portable remote information capture device further comprises a digital camera for capturing a consumer photo.

11. The remote information capture system as claimed in claim 1, wherein the remote information is security rounds data.

12. The remote information capture system as claimed in claim 1, wherein the remote information includes parking data.

13. The remote information capture, system as claimed in claim 5 wherein the signature capture module comprises:
 a module for storing the captured signature in a binary signature file format, including a module for identifying a plurality of points in a screen along the consumer signature and storing the plurality of points along with one or more indexes of one or more points among the plurality of points, each of the one or more indexes representing a disconnection with another point; and
 a module for reading the binary signature file format and creating an image of the captured signature.

14. The remote information capture system as claimed in claim 1, wherein the portable remote information capture device further comprises a module for providing a demographic data capture screen, the demographic data capture screen comprising:
 (i) a first entry screen comprising:
  a first field for displaying first entry data; and
  a list for displaying one or more than one possible first entry data, high-lighting the closest match from the list based on the input by the operator, a possible first entry data being selectable from the list to complete the first entry data, the first field being updated by the selected first entry data; and
 (ii) a second screen comprising:
  a second field for displaying the first entry data provided on the first field; and
  a button for saving the data displayed on the second field.

15. The remote information capture system as claimed in claim 10, wherein the portable remote information capture device further comprises a module for providing an image information screen, the image information screen useable by the operator for associating the captured consumer photo with the consumer personal data.

16. The remote information capture system as claimed in claim 1, wherein the computer program operative to manipulate the captured remote information is located on the portable remote information capture device.

17. The remote information capture system as claimed in claim 1, wherein the computer system is a laptop computer, and wherein the computer program operative to manipulate the captured remote information manipulates the captured remote information located on the laptop computer.

18. The remote information capture system as claimed in claim 1, wherein the computer system is a database server, and wherein the computer program operative to manipulate the captured remote information manipulates the captured remote information located on the database server.

19. The remote information capture system as claimed in claim 1, wherein the remote information capture device accesses the computer system through a docking cradle.

20. The remote information capture system as claimed in claim 1, wherein the remote information capture device accesses the computer system through a dial up connection.

21. The remote information capture system as claimed in claim 1, wherein the entry module comprises a manual entry screen comprising:
 (i) a first entry screen, comprising:
  a first field;
  a drop down list to display one or more than one possible first entry data, and
  a selection means operable by the operator by which a possible first entry data is selected from the one or more than one possible first entry data, the first field being updated by the selected first entry data,
 (ii) a second entry screen, comprising:
  a keypad activated by a stylus operable to input second entry data;
  a display means for displaying the input by the keypad and stylus at the second field;
  a scroll list field to display one or more than one possible second entry data in response to the input; and
  a selection means operable by the operator by which a possible second entry data is selected from the one or more than one possible second entry data; and
 (iii) a third screen, comprising:
  a third field for displaying one of:
   the first entry data provided on the first entry screen; and
   the second entry data provided on the second entry screen; and
  a button on the third screen for saving the data displayed third field data.

22. The remote information capture system as claimed in claim 1, wherein storing the captured remote information on the accessible computer system is done in batch files.

23. The remote information capture system as claimed in claim 1, wherein storing the captured remote information on the accessible computer system is done in real time.

24. The remote information capture system as claimed in claim 1, wherein the consumer's ID is a driver's license.

25. The remote information capture system as claimed in claim 1, wherein the consumer's ID is a loyalty rewards card.

26. The remote information capture system as claimed in claim 1, wherein the portable remote information capture device accesses the computer system over the Internet.

27. The remote information capture system as claimed in claim 10, wherein the remote information further comprises the captured consumer photo.

28. The remote information capture system as claimed in claim 15, wherein the captured consumer photo is associated with the consumer personal data through an image number.

29. The remote information capture system as claimed in claim 16, wherein the portable remote information capture device comprises an email address generator module for automatically generating an email address for a consumer based on the personal data captured by the reader and displaying the automatically generated email address, and a module for accepting a change to the automatically generated email address from the consumer.

30. The remote information capture system as claimed in claim 18, wherein the computer program comprises an electronic marketing engine module for electronic marketing utilizing the captured remote information.

31. The remote information capture system as claimed in claim 16, wherein the computer program comprises an electronic contest generator.

32. The remote information capture system as claimed in claim 18, wherein the computer program comprises a means for driving customers to a web site utilizing the captured remote information.

33. The remote information capture system as claimed in claim 1, wherein the computer program comprises an incorporator module for incorporating at least one of the captured consumer personal data and consumer preference data as a text data within a multimedia presentation.

34. The remote information capture system as claimed in claim 29, wherein the email address generator module comprises a module for providing an email capture screen to capture the email address, the email capture screen comprising a field and a plurality of buttons to manipulate an address displaying on the field, the buttons comprising:
  (i) a first button for inserting the consumer's name from the captured remote information;
  (ii) a second button for toggling between one or more domain names; and
  (iii) a third button for toggling between one or more domain extensions.

35. The remote information capture system as claimed in claim 1, wherein the portable remote information capture device comprises:
  a module for defining odds for the one or more rewards; and
  a module for selecting a random winner from a group of consumers who have provided corresponding consumer personal data and consumer reference data, the one or more rewards being provided based on at least one of the uploaded one or more global rules, the defining module and the selecting module.

36. A method for the capture, storage and manipulation of remote information, the method comprising the steps of;
  (i) at a portable device, capturing remote information comprising consumer personal data and consumer preference data, comprising the steps of:
    capturing the consumer personal data encoded on a consumer's identification; and
    providing to an operator an entry module operable to enter the consumer
    preference data and associate the consumer preference data with the consumer's personal data;
  (ii) at a computer system,
    storing the captured remote information;
    creating one or more global rules; and
    managing one or more rewards based on the one or more global rules;
  (iii) manipulating the captured remote information;
  (iv) uploading the one or more global rules to the portable remote information capture device;
  (v) at the portable device, identifying a consumer who is eligible for the one or more rewards defined by the uploaded one or more global rules, the eligible consumer identified based on at least the captured remote information and the one or more global rules uploaded to the remote information capture device.

* * * * *